UNITED STATES PATENT OFFICE.

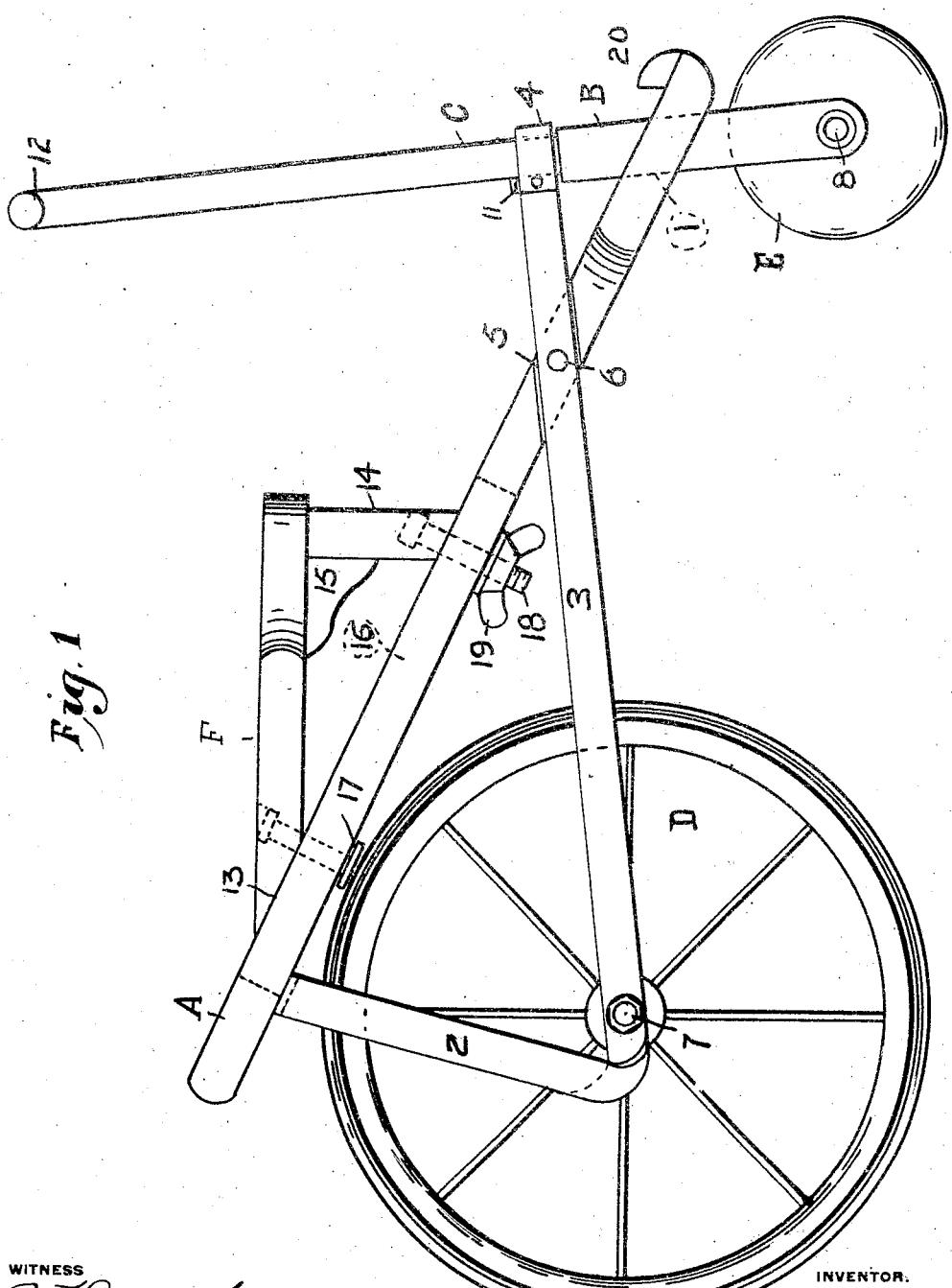

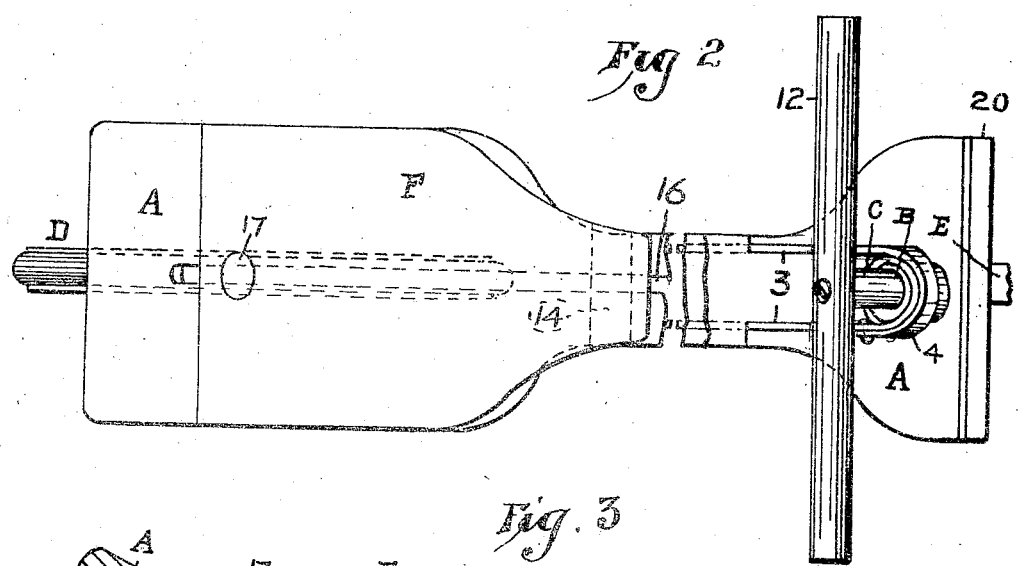
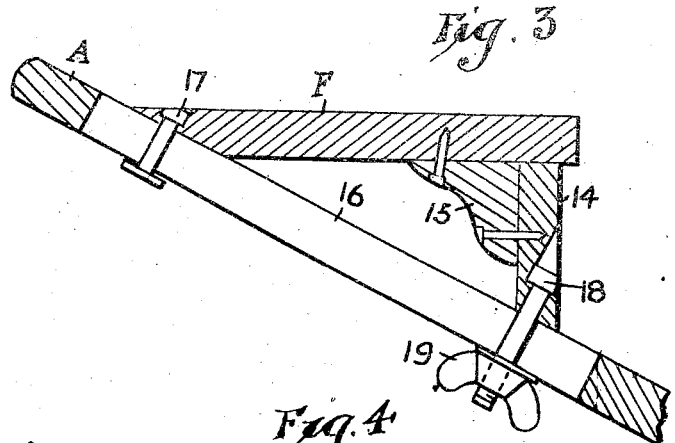
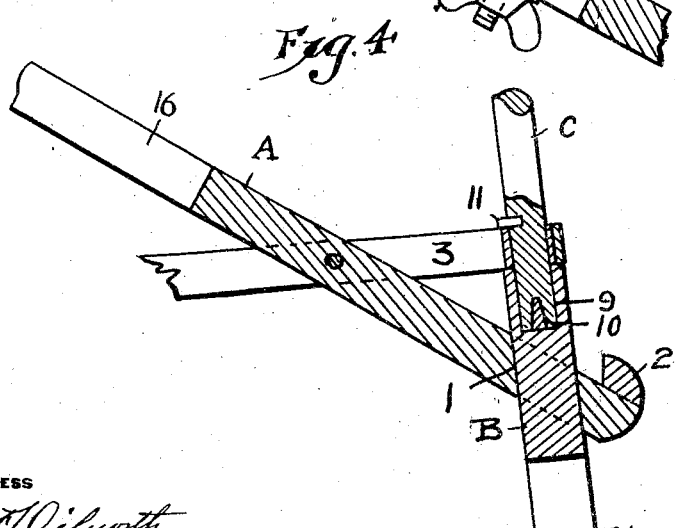

THOMAS O. MASON, OF BELLEVUE BOROUGH, PENNSYLVANIA, ASSIGNOR TO T. O. M. MANUFACTURING COMPANY, OF PITTSBURGH, PENNSYLVANIA, A CORPORATION OF PENNSYLVANIA.

CHILD'S VEHICLE.

1,241,474.

Specification of Letters Patent. Patented Sept. 25, 1917.

Application filed May 2, 1917. Serial No. 165,808.

*To all whom it may concern:*

Be it known that I, THOMAS O. MASON, a citizen of the United States, and residing in the borough of Bellevue, in the county of Allegheny and State of Pennsylvania, have invented or discovered new and useful Improvements in Children's Vehicles, of which the following is a specification.

My invention consists in a new and improved child's coaster or wheeled vehicle.

The object in view is the provision of a strong and durable, yet light, inexpensive and attractive vehicle which may be readily adjusted to use by children of various sizes.

In the accompanying drawings, Figure 1 is a side elevation of my invention; Fig. 2 is a broken plan view of the same; Fig. 3 is a vertical, longitudinal section of the rear part of the platform and of the slidable seat; and Fig. 4 is a similar view showing the front part of the platform and supporting frame, and also the means for mounting the front wheel fork and steering shaft.

The following is a detailed description of the drawings:

A represents the platform, preferably a wooden board, extended laterally at the rear and contracted toward the front of the vehicle. Said platform inclines downwardly toward the front of the vehicle where it is provided with a circular hole 1 which forms the bearing for the head or stock of the front wheel fork B.

The supporting frame for the platform is preferably composed of metal elements. Thus the downwardly and rearwardly extending bars 2 have their upper ends bent angularly to fit against and be secured to the under face of the platform A, and extend downwardly to join the forwardly, and preferably slightly upwardly, extending bars 3. In practice I prefer to form the bars 2 and 3 all of the same length of metal bar, the intermediate portion of the length being bent to bear against and be attached to the under face of the platform A. The front or free ends of the length of metal are bent about each other and riveted together to form the cylindrical bearing 4 for the steering shaft C, said bearing 4 being alined with but of smaller bore than the bearing hole 1 in the front end of the platform A.

The platform A is notched at its sides, as at 5, to receive the forwardly extending bars 3, and a bolt 6 extends through said bars 3 and the platform to bind the structure securely together and to strengthen and stiffen the frame of the vehicle.

D is the larger rear wheel or wheels, shown as a wire wheel which is preferable owing to the size, but it will be understood that a wooden wheel may be used, if desired. The axle 7 of the rear wheel is journaled in bearings formed by alined holes in the bars 3 near their rear ends.

E is the steering wheel, smaller than the rear wheel, and made of wood or wire, as may be desired. The axle 8 of the steering wheel is journaled in the lower end of the fork member B. The head or stock of said fork member is provided with a downwardly extending bore 9 in which is seated the lower end of the steering shaft C held rigidly in place by means of the internal wedge 10.

The bearing 4 formed in the front end of the metal frame preferably rests on the top of the stock B, and a pin 11 is driven into said shaft C to prevent the fork member and shaft dropping down through their bearings.

12 is the handle bar horizontally mounted on the upper end of shaft C. The fork member and steering shaft preferably incline rearwardly, as shown, so that the bearing 4 is at right angles to the bars 3, thus rendering the vehicle in a degree self-steering.

F is a horizontal seat board, wide at its rear end for the support of the rider, but narrowed toward the front to give leg clearance. The rear end of the seat is beveled at 13 to give a snug sliding fit with the top surface of the platform A. The front end of the seat F is supported by a vertical leg 14 rigidly attached thereto and having its foot beveled to give a snug sliding fit with the top surface of the platform A. 16 is a longitudinal slot in said platform. 17 is a double headed bolt or rivet extending down through the rear end of the seat F and through the slot 16, so as to hold the rear of the seat snugly in contact with the platform. 18 is a bolt extending through the lower portion of the leg 14 and through the slot 16. The lower end of said bolt is provided with a thumb nut 19 which may be screwed up against the under face of the platform A. 15 is a corner brace for the leg.

It is evident that by loosening the nut 19, the seat F may be slid either up or down the platform, thus permitting its adjustment to suit various sizes of riders, and that by tightening said nut, the seat may be rigidly held in any adjusted position.

The front end of the platform, beyond the steering fork is provided with a cross bar 20 which acts as a heel rest for the rider, and also strengthens the front of the platform.

It is evident from the foregoing that my improved vehicle is of very inexpensive and simple construction, but that it is also strong and durable and attractive. It may be adjusted to suit different sizes of children.

What I desire to claim is—

1. In a child's vehicle of the character described, the combination of a forwardly and downwardly inclined platform, front and rear wheels supporting said platform, a horizontal seat having its rear end resting on said platform, and a vertical support having its upper end secured to the front end of said seat and its lower end resting on said platform.

2. In a child's vehicle of the character described, the combination of a forwardly and downwardly inclined platform, front and rear wheels supporting said platform, and a seat mounted to slide on the inclined upper surface of said platform and adjustable at various levels thereon.

3. In a child's vehicle of the character described, the combination of a forwardly and downwardly extending platform, a wheel supporting the rear of said platform, a smaller steering wheel supporting the front of said platform, a horizontal seat having its rear end resting upon said platform, and a vertical support having its upper end secured to the front end of said seat and its lower end resting upon said platform.

4. In a child's vehicle of the character described, the combination of a forwardly and downwardly inclined platform, a wheel supporting the rear of said platform, a smaller steering wheel supporting the front of said platform, and a seat mounted to slide on the inclined upper surface of said platform and adjustable at various levels thereon.

5. In a child's vehicle of the character described, the combination of a forwardly and downwardly inclined platform, a frame supporting the rear of said platform, a rear wheel journaled in said frame, and a steering wheel mounted in the forward part of said frame.

6. In a child's vehicle of the character described, the combination of a forwardly and downwardly inclined platform, a frame supporting the rear of said platform, a rear wheel journaled in said frame, steering mechanism mounted on the front of said platform and frame, and a steering wheel journaled in said mechanism.

7. In a child's vehicle of the character described, the combination of a forwardly and downwardly inclined platform, a frame supporting the rear of said platform, a rear wheel journaled in said frame, said frame extending forwardly and intersecting said platform, a steering fork journaled in said platform and frame, a steering wheel journaled in said fork, and a seat mounted on said platform.

8. In a child's vehicle of the character described, the combination of a forwardly and downwardly inclined platform, a frame supporting the rear of said platform, a rear wheel journaled in said frame, said frame extending forwardly and intersecting said platform, a steering fork journaled in said platform and frame, a steering wheel journaled in said fork, and a seat mounted on said platform and adjustable at various levels thereon.

9. In a child's vehicle of the character described, the combination of a forwardly and downwardly inclined platform, a frame supporting the rear of said platform, a rear wheel journaled in said frame, said frame extending forwardly to intersect with and be attached to said platform, a steering fork journaled in said platform and frame, a steering wheel journaled in said fork, and a seat mounted on said platform and adjustable at various levels thereon.

Signed at Pittsburgh, Penna., this 1st day of May, 1917.

THOMAS O. MASON.